US009631939B2

(12) United States Patent
Brenner et al.

(10) Patent No.: US 9,631,939 B2
(45) Date of Patent: *Apr. 25, 2017

(54) METHODS AND SYSTEMS FOR DETERMINING ROUTING

(71) Applicant: PayPal Inc., San Jose, CA (US)

(72) Inventors: Jennifer T. Brenner, Austin, TX (US); Yu Tang, Round Rock, TX (US); Bryant Genepang Luk, Round Rock, TX (US); Robert He, Pflugerville, TX (US); Christopher Diebold O'Toole, Cedar Park, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/198,339

(22) Filed: Jun. 30, 2016

(65) Prior Publication Data

US 2016/0305789 A1    Oct. 20, 2016

Related U.S. Application Data

(63) Continuation of application No. 14/479,230, filed on Sep. 5, 2014, now Pat. No. 9,389,094.

(51) Int. Cl.
| | |
|---|---|
| *G01C 21/30* | (2006.01) |
| *G01C 21/32* | (2006.01) |
| *G01C 21/34* | (2006.01) |
| *G01C 21/36* | (2006.01) |
| *G06Q 10/02* | (2012.01) |

(52) U.S. Cl.
CPC ....... *G01C 21/3415* (2013.01); *G01C 21/343* (2013.01); *G01C 21/3676* (2013.01); *G06Q 10/02* (2013.01)

(58) Field of Classification Search
CPC .............. G01C 21/3676; G01C 21/343; G01C 21/3407; G01C 21/3423; G06Q 10/04; G06Q 10/047
USPC .......................................... 701/428
See application file for complete search history.

(56) References Cited

U.S. PATENT DOCUMENTS

| | | | | |
|---|---|---|---|---|
| 8,862,386 | B2* | 10/2014 | Griffiths | G01C 21/3423 340/995.19 |
| 9,117,182 | B2* | 8/2015 | Bapna | G06Q 10/025 |
| 9,175,967 | B2* | 11/2015 | Abramson | G01C 21/3697 |
| 9,389,094 | B2* | 7/2016 | Brenner | G01C 21/3676 |
| 9,435,657 | B2* | 9/2016 | Feng | G01C 21/343 |
| 2011/0087426 | A1* | 4/2011 | Feng | G01C 21/343 701/532 |
| 2015/0254581 | A1* | 9/2015 | Brahme | G06F 17/30241 705/5 |

(Continued)

*Primary Examiner* — Jamie Figueroa
(74) *Attorney, Agent, or Firm* — Maschoff Brennan

(57) ABSTRACT

Systems and methods are presented for sequencing locations and events and determining routing and itineraries for the sequence. In some embodiments the system may receive a starting location, a first location, and a second location in a default order. The system may determine a sequence from the starting location for the first location and the second location. The system may generate a route for the sequence with the route having transportation directions between the starting location, the second location, and the first location indicative of the sequence. The system may display the route in a graphical user interface of an application.

20 Claims, 14 Drawing Sheets

(56) References Cited

U.S. PATENT DOCUMENTS

| | | | |
|---|---|---|---|
| 2015/0300829 A1* | 10/2015 | Fitzpatrick | G06Q 10/1097 701/414 |
| 2016/0061623 A1* | 3/2016 | Pahwa | G01C 21/3614 701/440 |
| 2016/0202076 A1* | 7/2016 | Feng | G01C 21/343 701/408 |

* cited by examiner

METHODS AND SYSTEMS FOR DETERMINING ROUTING

PRIORITY

This application is a Continuation of and claims the benefit of priority to U.S. patent application Ser. No. 14/479,230 filed on Sep. 5, 2014, the contents of which are incorporated herein by reference in their entirety.

TECHNICAL FIELD

The subject matter disclosed herein generally relates to generating itineraries. In some example embodiments, the present disclosures relate to systems and methods for generating, scheduling, and routing a user itinerary.

BRIEF DESCRIPTION OF THE DRAWINGS

Some embodiments are illustrated by way of example and not limitation in the figures of the accompanying drawings.

DETAILED DESCRIPTION

Example methods and systems are directed to organizing and sequencing a set of events or locations and generating routes and itineraries based on the sequences determined for the set of events or locations. In some example embodiments, an application may receive, from a user, information relating to a plurality of locations, events, appointments, or other places of interest. The application may determine an optimal sequence or set of sequences for traveling between locations representative of the information received from the user. The application may then generate a route, a set of routes, an itinerary, or modify an existing route or itinerary based on the sequence or set of sequences. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some example embodiments, methods and systems of the present disclosure may receive, sequence, and/or publish a set of appointments or services and times for a merchant. The appointments of the merchant may be used by an application, exemplifying the methods and systems of the present disclosure, in determining optimal sequences or sets of sequences of user entered locations, events, or places of interest.

In some example, embodiments, an application exemplifying the present disclosure may determine information about the user, such as preferences, common activities, and the like, in order to generate suggestions for additional activities or locations of interest along a generated route or in a generated itinerary. When selected by the user, the application may determine a new sequence or set of sequences by inserting the suggested activity or location into the sequence or set of sequences. The application may then generate a route or itinerary based on the new sequence or set of sequences.

With regard to suggesting activities or locations, in some example embodiments, the application may communicate with systems of merchants publishing sets of appointments or services in order to request reservations or available appointment slots within the set of appointments. Once the reservation has been accepted or confirmed by the merchant, the application may generate a new sequence or set of sequences and a new route or itinerary including the reservation, indicated by a time, place, and set of directions between the reservation and other locations, events, or activities within the sequence and the route or itinerary.

Figure 1:
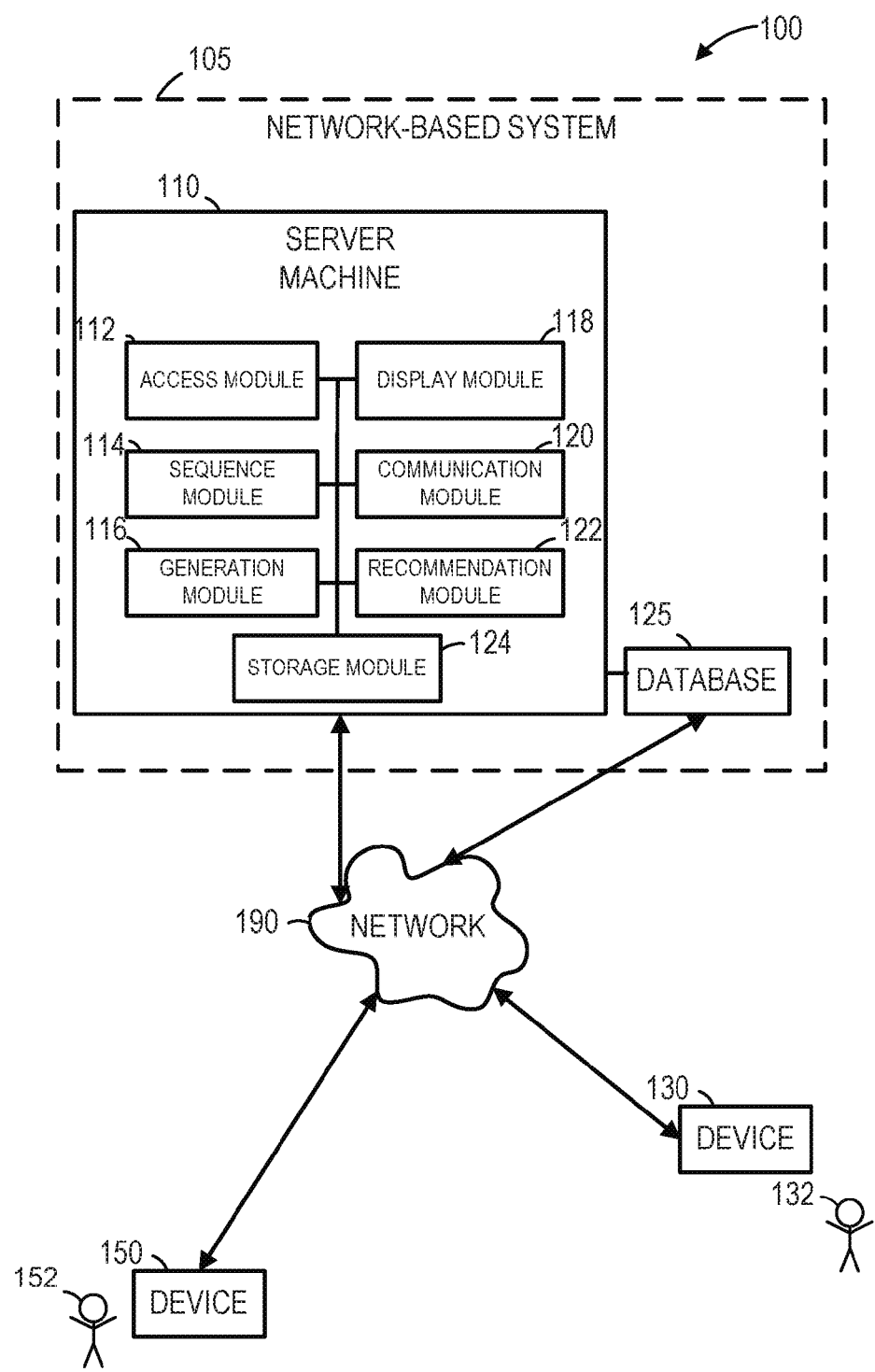
FIG. 1 is network diagram illustrating a network environment, according to some example embodiments.

FIG. 1 is a network diagram illustrating a network environment 100 suitable for determining a sequence of a plurality of locations or events and generating routes or itineraries indicative of the plurality of locations or events according to the sequence, according to some example embodiments. The network environment 100 includes a server machine 110, a database 125, and devices 130 and 150, all communicatively coupled to each other via a network 190. The server machine 110 may form all or part of a network-based system 105 (e.g., a cloud-based server system configured to provide one or more services to the devices 130 and 150). The server machine 110 and the devices 130 and 150 may each be implemented in a computer system, in whole or in part, as described below with respect to FIG. 8.

FIG. 1 additionally illustrates components of the server machine 110, according to some example embodiments. The server machine 110 is shown as including an access module 112, a sequence module 114, a generation module 116, a display module 118, a communication module 120, a recommendation module 122, and a storage module 124 all configured to communicate with each other (e.g., via a bus, shared memory, or a switch). Any one or more of the modules described herein may be implemented using hardware (e.g., one or more processors of a machine) or a combination of hardware and software. For example, any module described herein may configure at least one processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. For example, in some embodiments, certain modules or a portion of the access module 112, the sequence module 114, the generation module 116, the display module 118, the communication module 120, the recommendation module 122, and the storage module 124, may be included in one or more of the devices 130 and 150, as included within an application. By way of additional example, in some embodiments, an application on one or more of the devices 130 and 150 may interact with the communication module 120 to perform the methods of the present disclosure.

One or both of the users 132 and 152, shown in FIG. 1, may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
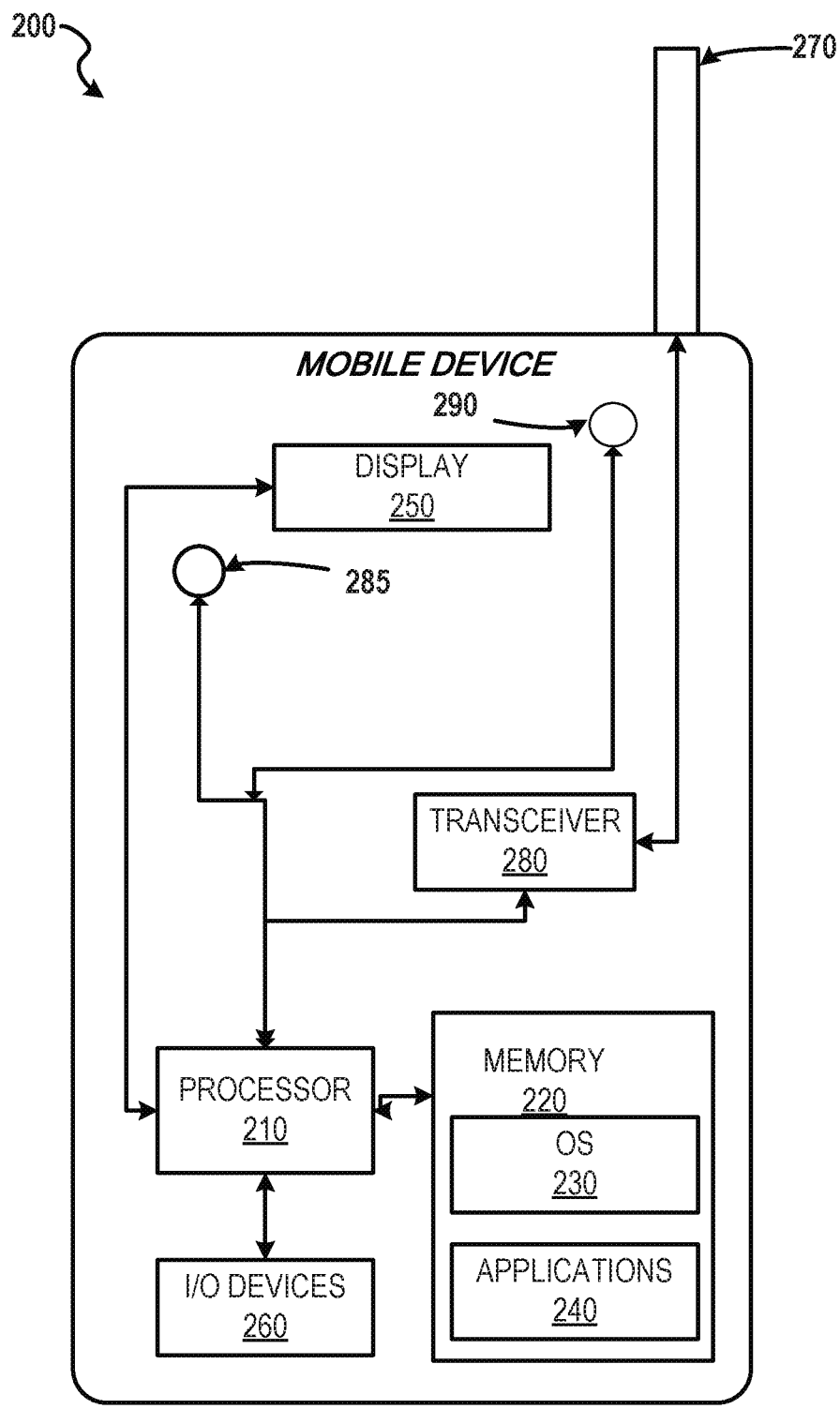
FIG. 2 is a block diagram illustrating a mobile device suitable for executing a portion of a set of instructions of the route or itinerary generation system, according to some example embodiments.

Referring to FIG. 2, a block diagram illustrating a mobile device 200 configured to interface and communicate with various aspects of the network environment 100 and the network-based system 105 presented, according to some example embodiments. In at least some embodiments, the mobile device 200 may be an implementation of the device 130 or the device 150. Examples of the mobile device 200 may include a tablet or other device owned and controlled by a user, a merchant, a service provider, or the like. In some embodiments, the mobile device 200 and the merchant or service provider may be associated with a static location. In some embodiments, the mobile device 200 and the merchant or service provider may operate within an area or region. For example, the merchant may be a food truck, operating in differing parts of a city during the course of a day or a service provider visiting various appointment sites during a given day.

The mobile device 200 may include a processor 210 and a memory 220, where the memory 220 stores an operating system 230 and one or more applications 240, in addition to the operating system 230. In some embodiments, the mobile device 200 may also include a display 250, one or more input/output devices 260, an antenna 270, and a transceiver 280.

The processor 210 may be any of a variety of different types of commercially available processors suitable for the mobile devices 200 (e.g., an XScale architecture microprocessor, a Microprocessor without Interlocked Pipeline Stages (MIPS) architecture processor, or another type of processor). The processor 210 may be configured to operate one or more applications 240, which may be configured to interface and communicate with various aspects of the network environment 100. Data from the display 250 and transceiver 280, and other input modules, not shown, may be processed by processor 210.

The processor 210 may be coupled, either directly or via appropriate intermediary hardware, to the display 250 and to one or more input/output (I/O) devices 160, such as a keypad, a touch panel sensor, a microphone, a controller, a camera, and the like. Similarly, in some embodiments, the processor 210 may be coupled to the transceiver 280 that interfaces with the antenna 270. In some example embodiments, the processor 210 may include a plurality of processors, a plurality of processor cores in a multi-core processor, or modules configured to perform various operations according to aspects of the present disclosure.

The memory 220, such as a random access memory (RAM), a Flash memory, or other type of memory, may be accessible to the processor 210. The memory 220 may be adapted to store the operating system (OS) 230, as well as the application(s) 240, such as a mobile application for sequencing events or locations and generating routes or itineraries for the events or locations based on the sequence of the events or locations.

The display 250 may be configured to display information relevant to the user's 132 or 152 interactions with the network-based system 105. The display 250 can be coupled to the processor 210, which can process and generate the graphical information for display in the display 250. In some example embodiments, the display 250 can include any suitable display device such as a touchscreen or touch data functionality, in that the user 132 can interface with a graphical user interface (GUI) displayed on the display 250 via some kind of tactile input.

The antenna 270 may receive and transmit signals to and from the networked-based system 105. In some cases, various commands and information can be sent to and passed on from the mobile device 200, via the antenna 270, through the network 190 and to the network-based system 105 to various other aspects of the network environment 100. The antenna 270 can be coupled to a transceiver 280. The transceiver 280 may be configured to both transmit and receive cellular network signals, wireless data signals, or other types of signals via the antenna 270, including information related to conducting consumer transactions, such as scheduling events or services; interacting with other network-based systems; interacting with other users; accessing events, locations, appointments, or reservations; sequencing events or locations; mapping locations and events; and generating or receiving generated routes and/or itineraries in the network environment 100.

Figure 3:
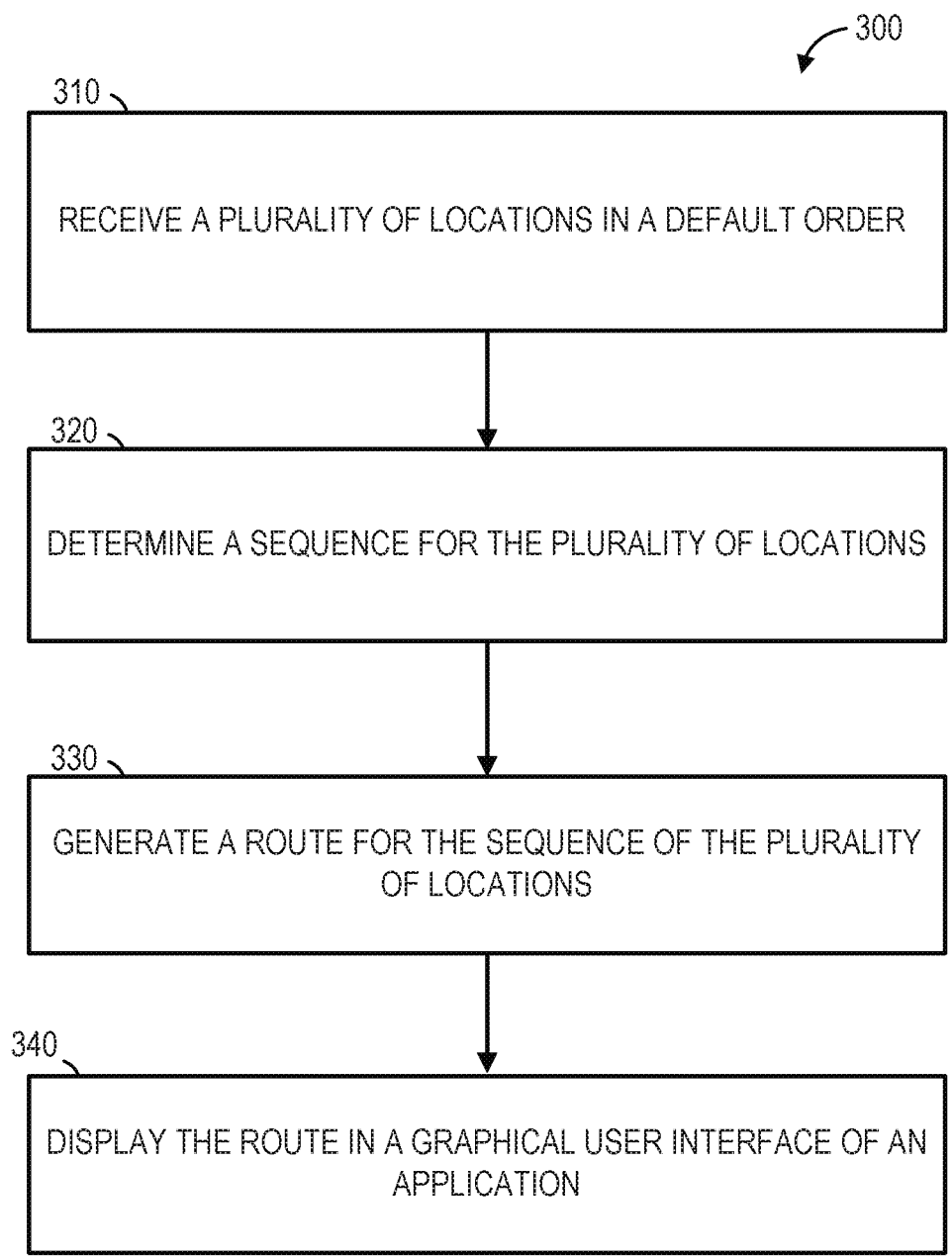
FIG. 3 is a flow chart illustrating operations of a device in performing a method of sequencing locations and generating a route based on the sequence, according to some example embodiments.

FIG. 3 is a flow chart illustrating operations of the device 130 or 150, the network-based system 105, or a combination thereof, in performing a method 300 of sequencing a set of locations and generating a route in accordance with the sequence, according to some example embodiments. Operations in the method 300 may be performed by the device 130 or 150, using modules described above with respect to FIG. 1. As shown in FIG. 3, the method 300 includes operations 310, 320, 330, and 340. Although the operations of method 300 may be performed on the network-based system 105 or the device 130 or 150, or performed with a portion of the method 300 being performed on the network-based system 105 and a portion being performed on the device 130 or 150, for the sake of clarity, the method 300 will be described with reference to the device 130.

In operation 310, the device 130 receives a plurality of locations in a default order. For example, the device 130 may receive a starting location, a first location, and a second location in a default order. The plurality of locations may be any location, such as an address, geographical coordinates, an intersection of cross streets, or the like. The default order may be determined by the user 132 entering the plurality of locations into a graphical user interface of the application on the device 130. In some embodiments, the access module 112 may perform the function of operation 310 of the method 300 by accessing events from a second application without the user 132 entering information into the application performing the method 300.

In some embodiments, the location may be determined by the device 130, using the application accessing the network-based system 105 or using the network environment 100 and a third party network-based system. For example, the user 132 may enter a term having an associated location, such as a search term, such as a type of food; a name of a business; a name of an office of a governmental agency; or the like. The user 132 may indicate a desire to search for the associated location using the search term. The device 130 may determine, based on the term, the associated location by transmitting a query, through the network 190 to the network-based system 105. The network-based system 105 may then determine the associated location and transmit the associated location to the device 130. In some embodiments, the device 130 may suggest the associated location or a set of associated locations to the user 132. In some embodiments, the device 130 may automatically populate one or more data entry fields with the associated location.

In operation 320, the device 130 determines a sequence for the plurality of locations. In some embodiments, the sequence may be initiated from a starting location or a current location of the user 132. For example, where the device 130 receives the starting location, the first location, and the second location, the device 130 may determine the sequence from the starting location for the first location and the second location. The device 130 may determine the sequence based on sequence factors in order to determine or attempt to determine an optimal sequence for arriving at the locations. For example, the sequence may be determined with the second location preceding the first location in the sequence, based on the sequence factors. In at least some embodiments, the device 130 may determine a sequence regardless of or despite the order, in which the locations were received, based on the sequence factors. In some embodiments, the sequence module 114 may perform the function of the operation 320 of the method 300 in the application.

The sequence factors may be selection criteria or characteristics relating to the location. For example, in some embodiments, the sequence factors may include a distance between a starting location and a subsequent location, a distance between two locations, a round trip distance, traffic conditions, a time of day, a transportation delay between locations, transit times between locations, hours of operation of a location, a predetermined range of time, a vehicle fueling station location, a vehicle effective range, a public transportation availability, a transportation type, a weather forecast, a current weather condition, a selected importance of the location, a scheduled time associated with the location, and the like.

In some embodiments, the device 130 may apply differential weights to one or more of the sequence factors. For example, the device 130 may accord a higher weight to the sequence factors of the vehicle effective range, the selected importance of the location, and the scheduled time than to the sequence factors of the round trip distance, the distance between two locations, and the vehicle fueling station location. Further, in some embodiments, the weight applied to one or more of the sequence factors may change based on the plurality of locations received by the device 130, the transportation type, or the combination of sequence factors applied to sequence the plurality of locations.

In operation 330, the device 130 generates a route for the sequence. The route may comprise transportation directions between the plurality of locations. For example, where the device 130 receives the starting location, the first location, and the second location, the device 130 may generate the route between the starting location, the second location, and the first location indicative of the sequence. In some embodiments, the transportation directions of the route may comprise walking directions, bicycling directions, driving directions, public transportation directions, or the like. In some embodiments of the public transportation directions, the device 130 may communicate with another application, the network-based system 105, or a third party network-based system to arrange for a chauffeur, chartered transportation, a flight, or other schedulable transportation. Further, in some embodiments, the route generated by the device 130 may comprise multiple differing types, such as a route comprising a combination of driving directions, walking directions, and public transportation directions. In some embodiments, the generation module 116 may perform the operation 330 of the method 300 in the application.

In operation 340, the device 130 displays the route in a graphical user interface of the application. In some embodiments, the device 130 may display a plurality of routes with associated travel times. In some embodiments, the route may be displayed as a list of directions, a course charted on a map, a combination of a course charted on a map and a list of directions, spoken directions, or combinations thereof. In some embodiments, the display module 118 may perform the operation 340 in the application.

By way of illustration for method 300, the user 132 may enter the plurality of locations, indicative of errands that the user 132 needs to run during a given day. For instance, the user 132 may have run out of milk on Monday, determined that she needed an oil change on Tuesday, and realized on Wednesday that she needed to renew her driver's license. The user 132 may enter the locations, of a grocery store, an oil change business, and a local branch of the Department of Motor Vehicles, into the application in the above sequence. However, given the location of the errands, the nature of the errands, and the expected time required to complete the errands, the order listed may not be an optimal order for completing the errands within the same day. Further, the order listed may result in an outcome contrary to the purpose of the errand, such as milk spoiling in a hot car while waiting in line at the DMV. The device 130 may determine, based on the sequence factors, that a duration of a visit to the DMV may be longer based on a later arrival time, that the store, having milk, may be open later than the DMV, and that the oil change business closes before the store. The device 130 may then determine a sequence for the locations in the order of visiting the DMV, visiting the oil change business, and stopping at the store prior to returning home. However, the device 130 may also determine, based on an appointment for the oil change, that despite incurring a longer wait at the DMV, the oil change should be included in the sequence prior to the visit to the DMV.

Figure 4:
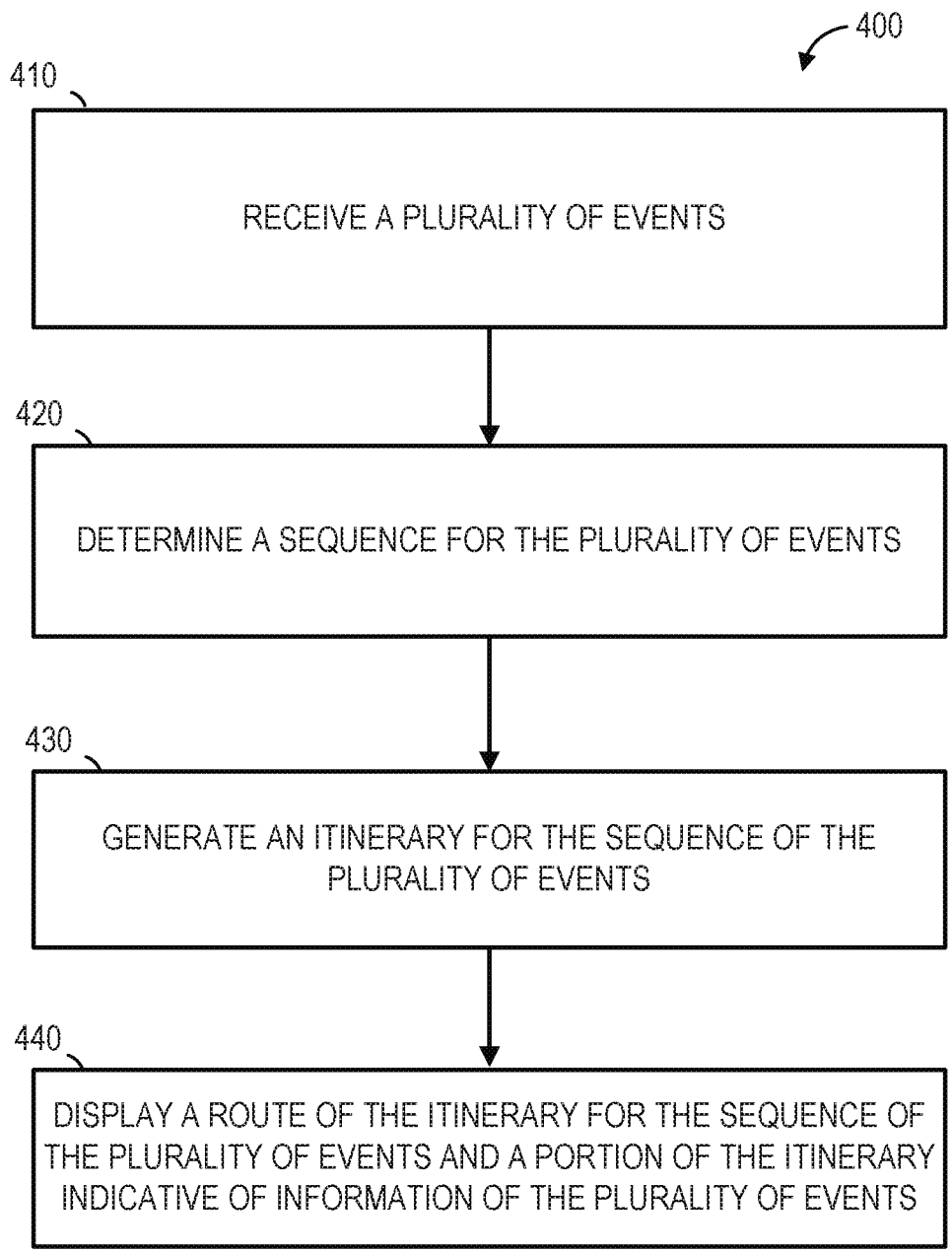
FIG. 4 is a flow chart illustrating operations of a device in performing a method of sequencing events and generating an itinerary and route based on the sequence, according to some example embodiments.
Figure 5:
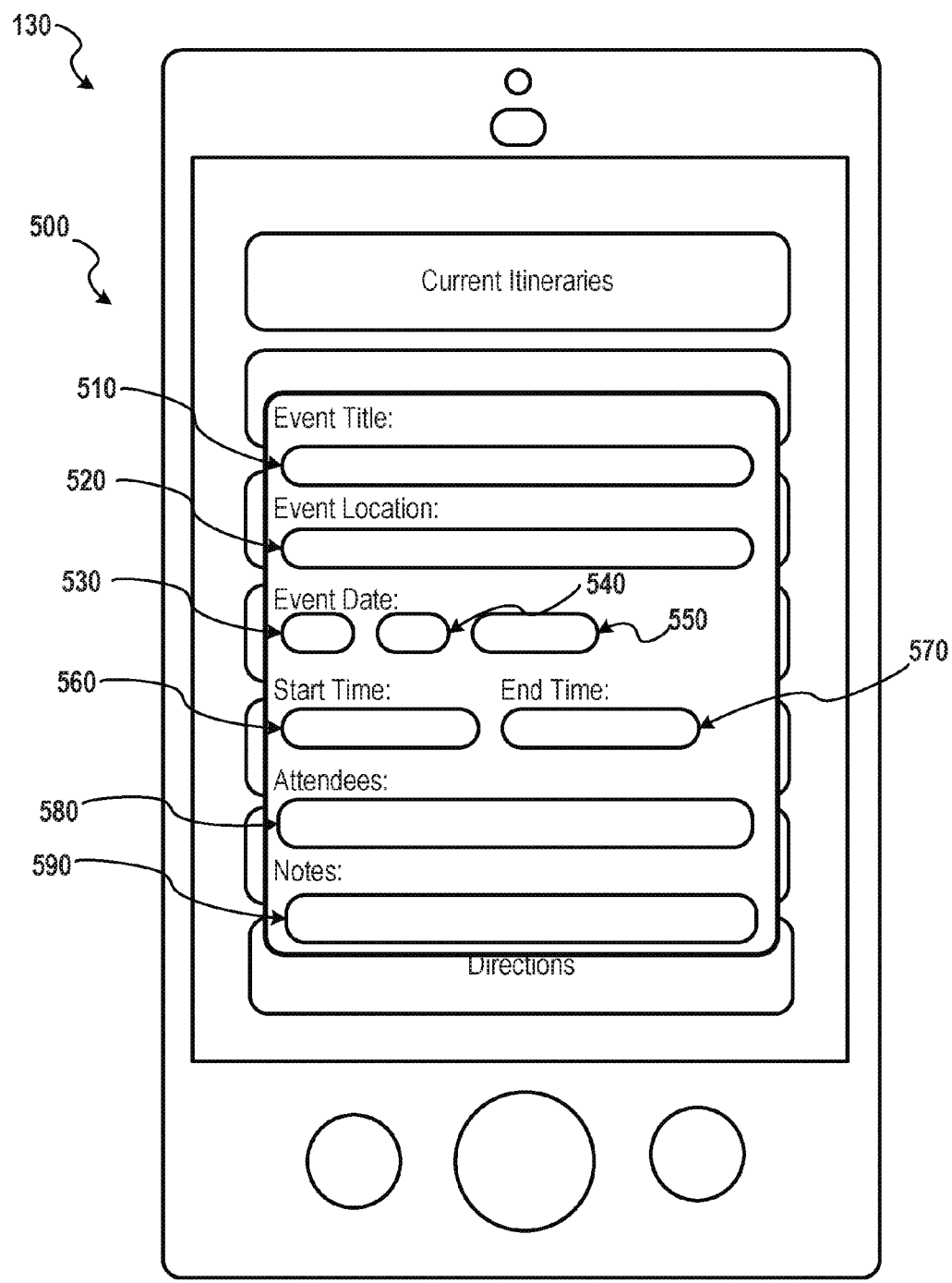
FIG. 5 is an illustration of an example graphical user interface of an application receiving information indicative of an event, according to some example embodiments.

Referring now to FIGS. 4 and 5, FIG. 4 is a flow chart illustrating operations of the device 130 or 150, the network-based system 105, or a combination thereof, in performing a method 400 of sequencing a set of events and generating an itinerary in accordance with the sequence, according to some example embodiments. Operations in the method 400 may be performed by the device 130 or 150, using modules described above with respect to FIG. 1. As shown in FIG. 5, the method 400 includes operations 410, 420, 430, and 440. Although the operations of method 400 may be performed on the network-based system 105 or the device 130 or 150, or performed with a portion of the method 400 being performed on the network-based system 105 and a portion being performed on the device 130 or 150, for the sake of clarity, the method 400 will be described with reference to the device 130.

In the operation 410, shown in FIGS. 4 and 5, the device 130 receives a plurality of events. At least a portion of the events having a location and a time. For example, the device 130 may receive a first event and a second event in a default order. In this example, a first location is a location of the first event and a second location is the location of a second event. The first event may also have a first time indicative of a start of the event. In some embodiments, the second event may also have a time, and at least one of the first event and the second event may have a time duration, an expected duration, a starting time range, an ending time range, and a second time indicative of an end of the event.

As shown in FIG. 5, an application 500 may have a graphical user interface with a plurality of data entry fields configured to receive data indicative of aspects of the event. As depicted, the application 500 has data entry fields 510-590. The data entry field 510 may receive data indicative of an event title. The data entry field 520 may receive data indicative of an event location. The data entry fields 530, 540, and 550 may receive event date information of month, day, and year, respectively, for example. It will be understood that in countries with differing date conventions, the organization of data indicative of a month, a day, and a year for an event, within the data entry fields 530, 540, and 550, may change. The data entry field 560 may receive a start time for the event, and the data entry field 570 may receive an end time. The data entry field 580 may receive data indicative of attendees of the event. The data entry field 590 may receive data indicative of notes for the event.

Although depicted with data entry fields 510-590, it will be understood that the application 500 may have greater or fewer data entry fields. For example, in some embodiments, data indicative of required attendance, an indication of importance, recurrence information, and other data indicative of the event may be entered into the data entry field 590 as a note. However, in some embodiments, distinct data entry fields may be provided for each type of information or characteristic relating to an event. Similarly, the application 500 may be provided with a selectable element within the graphical user interface, associated with event data being entered, enabling the user 132 to add additional data entry fields and specify characteristic or information types associated with those additional data entry fields.

Referring again to FIG. 4, in the operation 420, the device 130 may determine a sequence of the first event and the second event. In some embodiments, the sequence may be initiated from a starting location, a current location, a starting event, or a current event associated with the user 132. For example, where the device 130 receives the first event and the second event, the device 130 may determine the sequence from the starting location for the first event and the second event. The device 130 may determine the sequence based on sequence factors in order to determine or attempt to determine an optimal sequence for arriving at the first location associated with the first event and the second location for the second event. In some embodiments, where one or more of the plurality of events has an associated time (e.g., a scheduled starting time, a scheduled ending time, a scheduled duration, an expected duration, a time range, or the like), the device 130 may determine an optimal sequence for arriving at the first location and the second location within the constraints of the associated time(s) and in light of parameters such as transportation times and schedules. For example, the sequence may be determined with the second event preceding the first event in the sequence, based on the sequence factors. In at least some embodiments, the device 130 may determine a sequence regardless of or despite the order, in which the locations were received, and regardless of or despite a desired order of the user 132, based in part on the sequence factors.

The sequence factors may be selection criteria or characteristics relating to the plurality of events. For example, in some embodiments, the sequence factors may include a distance between a starting location and a location of one of the plurality of events, a distance between two locations associated with two of the plurality of events, a round trip distance, traffic conditions, a time of day, a transportation delay between locations, transit times between locations, hours of operation of a location, a predetermined range of time, a vehicle fueling station location, a vehicle effective range, a public transportation availability, a transportation type, a weather forecast, a current weather condition. Further, in some embodiments, the sequence factors may be related to characteristics of the events, such as a selected importance of the event, a scheduled starting time of the event, a scheduled ending time, a scheduled duration, an expected duration, a time range, selected importance of the event, a requirement of the event (e.g., a court appearance, a mandatory business meeting, an interview, or the like), an indication of desire for an event indicated by the user 132, a user preference, a connection to social media, and other characteristics relating to one or more of the plurality of events, the user 132, or a combination thereof.

In some embodiments, the device 130 may apply differential weights to one or more of the sequence factors. For example, the device 130 may accord a higher weight to the sequence factors of the vehicle effective range, the selected importance of the location, and the scheduled time than to the sequence factors of the round trip distance, the distance between two locations, and the vehicle fueling station location. Similarly, the device 130 may accord a higher weight to the sequence factors of a selected importance of the event, a requirement of the event, a scheduled starting time of the event as opposed to a time range for the event. Further, in some embodiments, the weight applied to one or more of the sequence factors may change based on the plurality of locations received by the device 130, the transportation type, or the combination of sequence factors applied to sequence the plurality of locations.

In the operation 430, the device 130 generates an itinerary for the plurality of events. The itinerary may comprise information indicative of locations for events ordered according to the sequence, a route extending between a starting location and locations of the plurality of events, and information indicative of the plurality of events. For example, where the device 130 receives a starting location, a first event, and a second event, the device 130 may generate the itinerary for the starting location, the first location, and the second location. In this example, the itinerary may comprise information indicative of a first location of the first even and information indicative of a second location of the second event, the first and second locations ordered according to the sequence. In some embodiments, the information indicative of the first event may further comprise the first location and the first time and the information indicative of the second event may comprise the second location and a second time. In this example, the itinerary may additionally comprise the route extending between the starting location, the second location, and the first location, where the sequence indicates the second event preceding the first event. The itinerary may also comprise information indicative of the first event and information indicative of the second event.

The information indicative of the first event and the information indicative of the second event may include an event title, an event location, an event date, an event time (e.g., start time, end time, duration, etc.), attendees, notes, an indication of a level of importance for the event, materials required, and the like. For example, where the event is an appointment, the information indicative of the event may include the event location, the event date, the event time, the attendees, a type of appointment, a notes section, an indication of recurrence for the event, a next scheduled occurrence of the event, and the like.

In some embodiments, the operation 430 may generate a second route for the sequence. The second route may comprise second transportation directions between the plurality of events or the plurality of locations indicative of the plurality of events. For example, where the device 130 receives a starting location, a first event with a first location, and a second event with a second location, sequenced such that the second event precedes the first event, route may be a first route which includes a first time for the first event and a second time for the second event. The second route may comprise second transportation directions between the starting location, a second location, and the first location. The second route may provide a third time associated with expected arrival at the second location and a fourth time associated with expected arrival at the first location. At least a portion of the second route may differ from the first route.

In the operation 440, the device 130 displays the route in a graphical user interface of the application. The operation 440 may further cause the device 130 to display at least a portion of the itinerary with the route in the graphical user interface of the application. For example, the device 130 may display the route on a map, depicted on the display 250 and one or more itinerary elements indicative of the plurality of events sequenced in the itinerary. In some embodiments, the route and the one or more itinerary elements are displayed simultaneously, while in some embodiments, when one of the route or the one or more itinerary elements is displayed, the other may be hidden or otherwise obfuscated in whole or in part. For example, the device 130 may display the one or more itinerary element as an overlay on top of a map displaying the route. In some embodiments, the device 130 may depict the map displaying the route as having pins, bubbles, notes, or other interactive graphic which the user 132 may select in order to display the one or more itinerary element and the information indicative of the event associated with or contained in the itinerary element.

In embodiments where the operation 430 generates the first route and the second route, the operation 440 may display a first selectable element indicative of the first route and a second selectable element indicative of the second route. In some embodiments, the first selectable element and the second selectable element may be the first route and the second route, respectively, depicted on a map on the graphical user interface of the application. In some embodiments, the first selectable element and the second selectable element may be depicted as thumbnails, individual maps on which a route is depicted (e.g., miniaturized maps presented in succession), or individual itineraries, for example.

Figure 6:
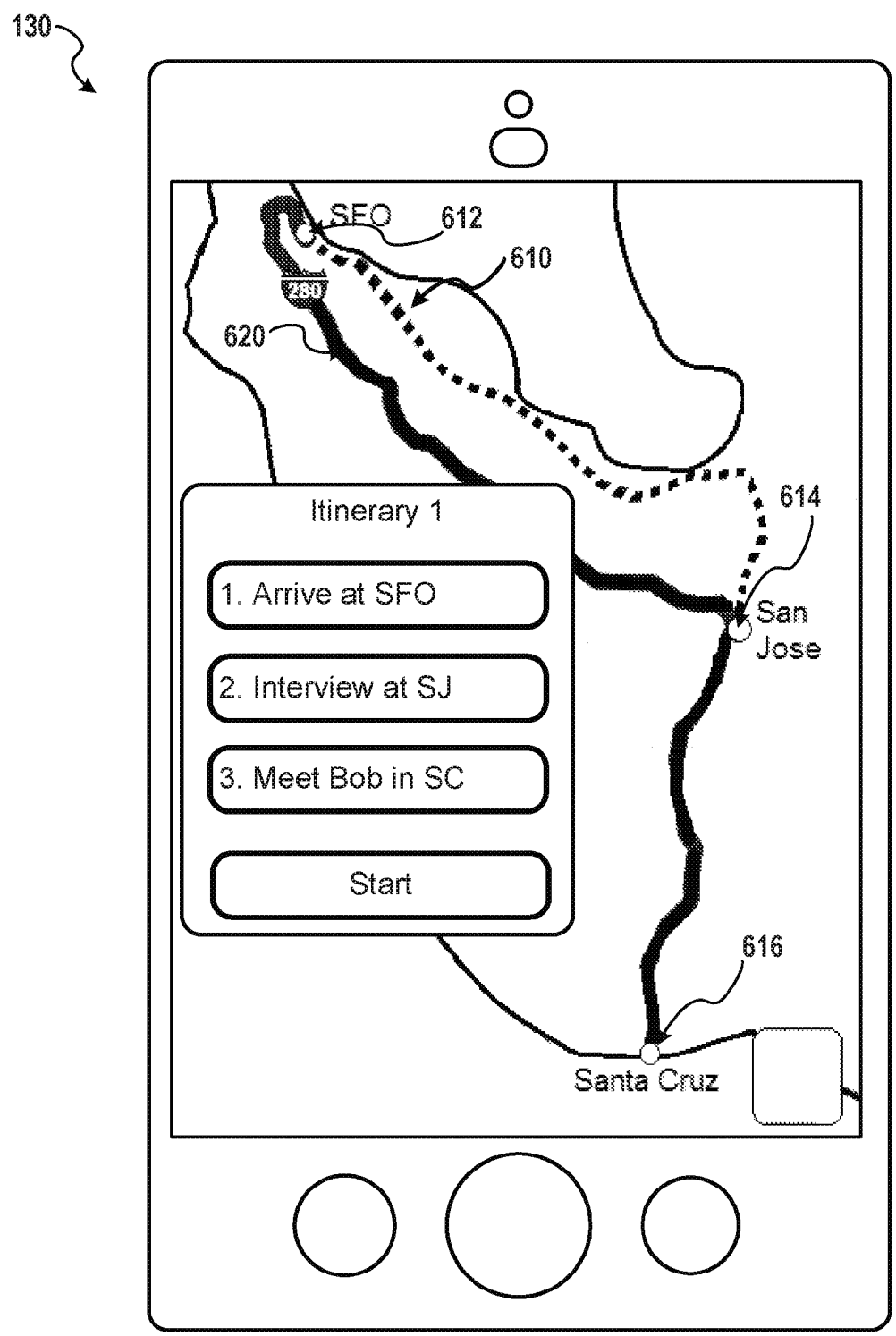
FIG. 6 is an illustration of an itinerary generated by the itinerary generation system, according to some example embodiments.

For example, as shown in FIG. 6, the application 600 may displays a first route 610 extending between a first event 612, a second event 614, and a third event 616 and a second route 620 extending between the first event 612, the second event 614, and the third event 616. Although the first route 610 and the second route 620 are shown as extending between the first, second, and third events 612, 614, and 616, respectively, the first route 610 and the second route 620 may also extend between the first, second, and third events 612, 614, and 616 by providing differing sequences.

Figure 7:
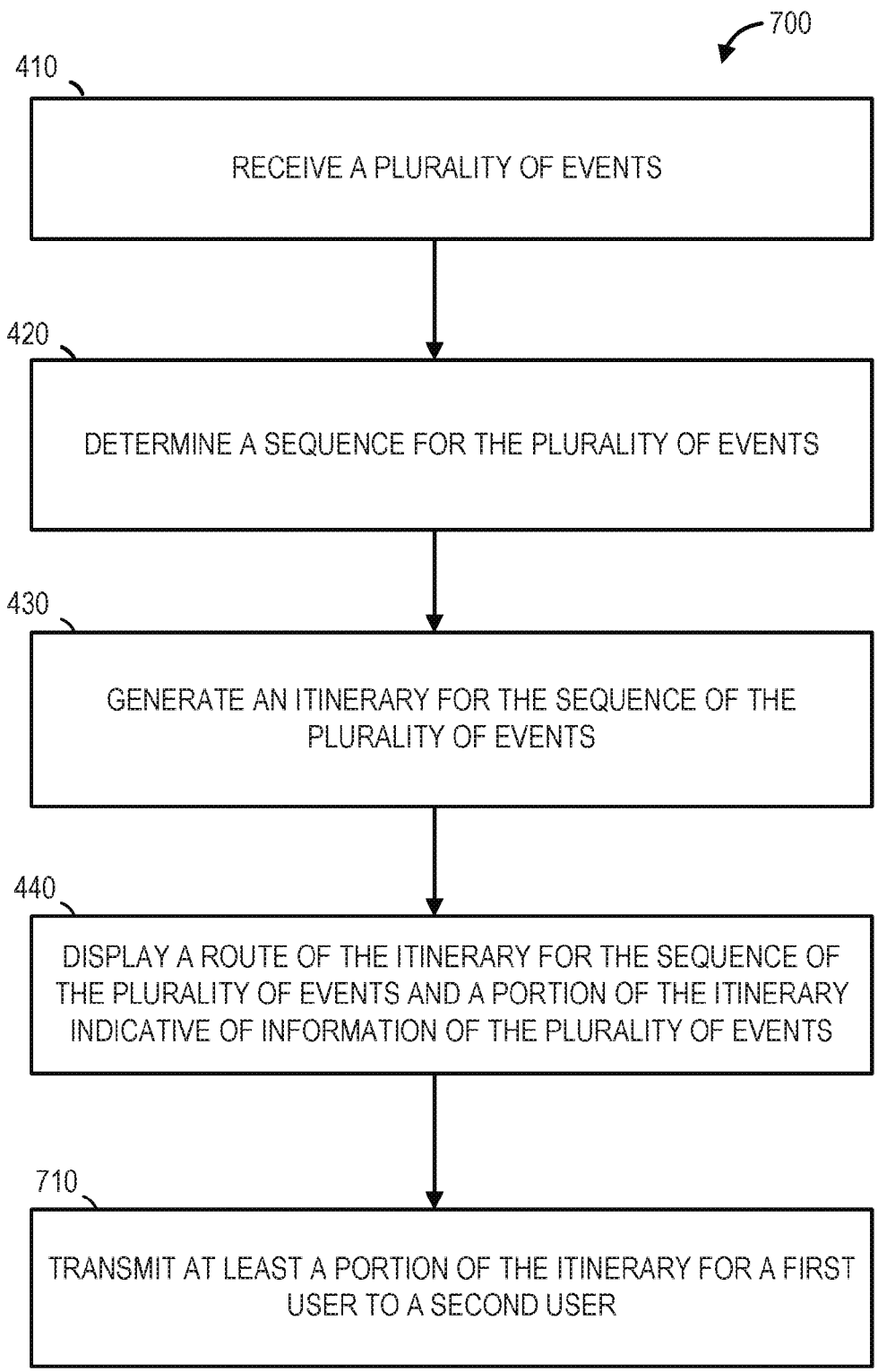
FIG. 7 is a flow chart illustrating operations of a device in performing a method of sequencing events and generating an itinerary and route based on the sequence, according to some example embodiments.

Referring now to FIG. 7, in some embodiments, a method 700 may include the operations 410-440 of method 400, and further include the operation 710, in which, the device 130 may transmit at least a portion of the itinerary, generated for the user 132 (e.g., a first user) to the user 152 (e.g., a second user). The device 130 may transmit the portion of the itinerary to the device 150 over the network 190 and through the network-based system 105, over the PSTN, over a cellular network, or by any other suitable methods and using any protocol appropriate to the method of transmission.

Figure 8:
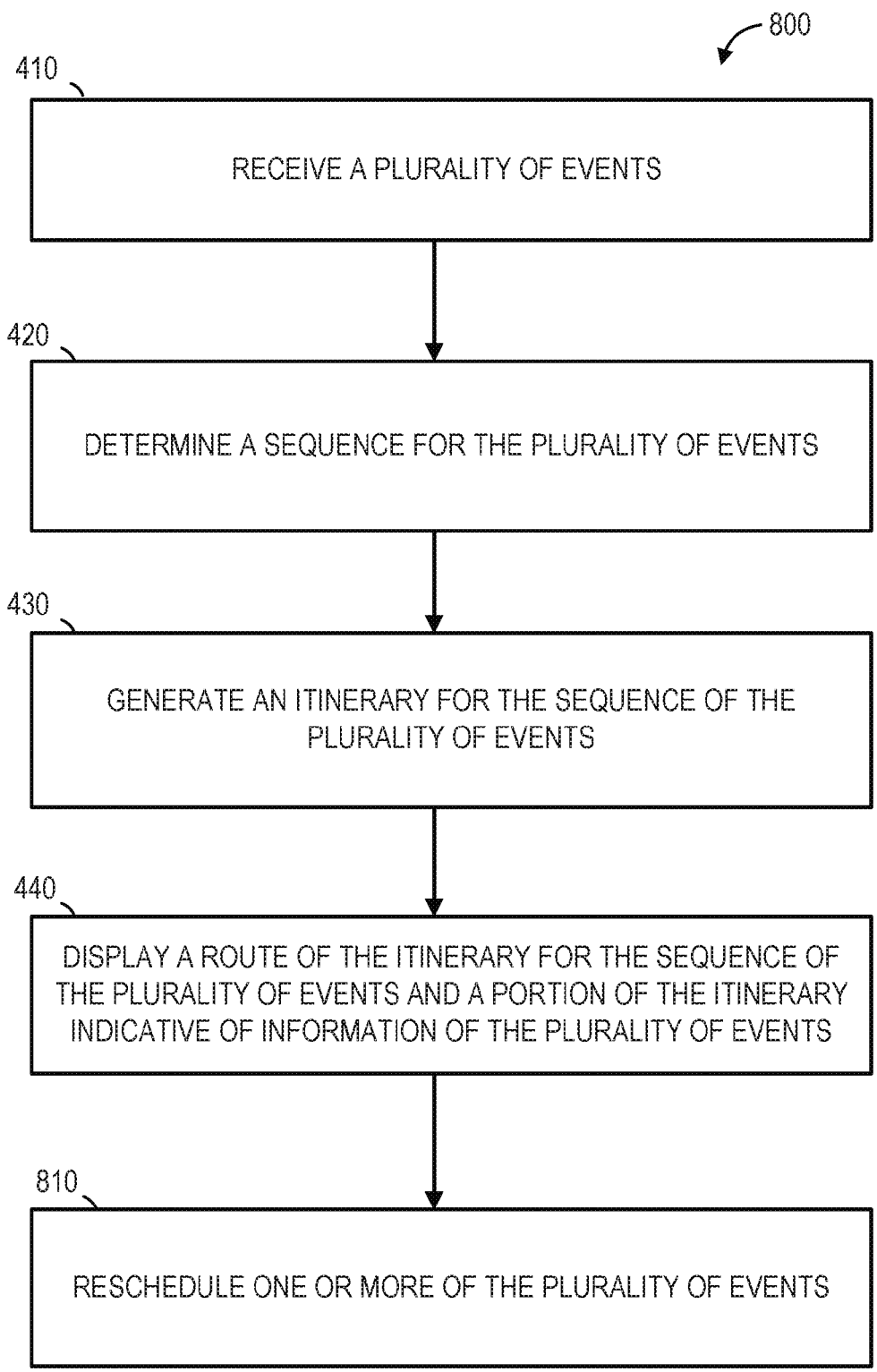
FIG. 8 is a flow chart illustrating operations of a device in performing a method of sequencing events, generating an itinerary and route based on the sequence, and rescheduling one of the sequence of events, according to some example embodiments.

Referring now to FIG. 8, in some embodiments, a method 800 may include the operations 410-440 of method 400, and further include an operation 810, in which, the device 130 reschedules one or more of the plurality of events. The operation 810 may be performed by the device 130 receiving an indication of a selection to reschedule a first event of the plurality of events within the itinerary generated by the operation 430. The device 130 may generate a suggested time to reschedule the first event based on a first time associated with the first event, a first location associated with the first event, and a second itinerary having a second plurality of events, each having a time and a location. The second itinerary may already have a determined second sequence of the second plurality of events. The operation 460, in some embodiments, may further be performed by determining a third sequence of the first event and each of the second plurality of events of the second itinerary. The third sequence may be determined similarly to the sequence determined by the operation 420. The device 130 may then generate a third itinerary for the first event and each event of the second plurality of events of the second itinerary.

Referring now to FIG. 9-12B, in some embodiments, a method 900 may include the operations 410-440 of method 400, and further include operations 910, 920, 930, 940, 950, 960, and 970. In operation 910, in which, the device 130 identifies a suggested event having a location and a time. The device 130 may identify the suggested event based on one or more of a plurality of events received by the device 130. In some embodiments, the device 130 may identify the suggested event based on a first event of the plurality of events, information indicative of the first event, a second event of the plurality of events, information indicative of the second event, one or more locations, and one or more times. For example, in some embodiments, the device 130 may additionally use one or more of the sequence factors to identify the suggested event. Although discussed in reference to a suggested event, the device 130 may suggest a location based on a plurality of received locations, such as a first location and a second location.

Figure 10:
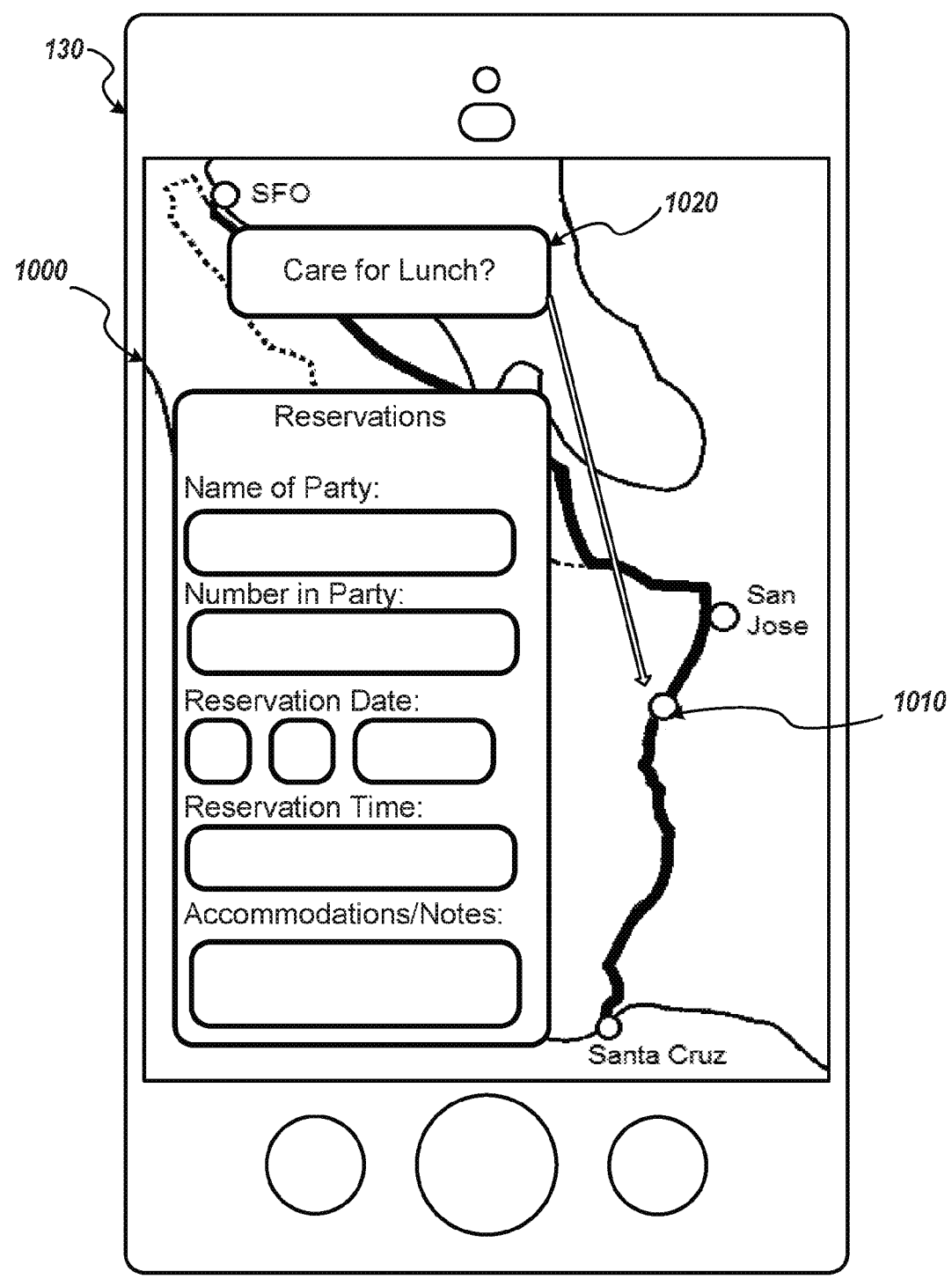
FIG. 10 is an illustration of an example suggested event and a reservation element, according to some example embodiments.

For example, as shown in FIG. 10, an application 1000 may suggest a lunch event and provide a suggested location 1010 for lunch. In some embodiments, the application 1000 may suggest an event, such as lunch, and indicate locations or merchants within a specified or predetermined range of the route. In some embodiments, the application 1000 may identify the suggested event, such as a lunch and a lunch location, based on information about the user 132, such as preferences expressed in social media, preferences expressed in the application 1000, recommendations within the application 1000, recommendations accessed by the application 1000, time parameters associated with the itinerary or route, traffic conditions or directions associated with the route, or other factors. The application 1000 may provide the user 132 with a selectable element 1020 enabling the user to indicate acceptance or denial of the suggested event.

Figure 9:
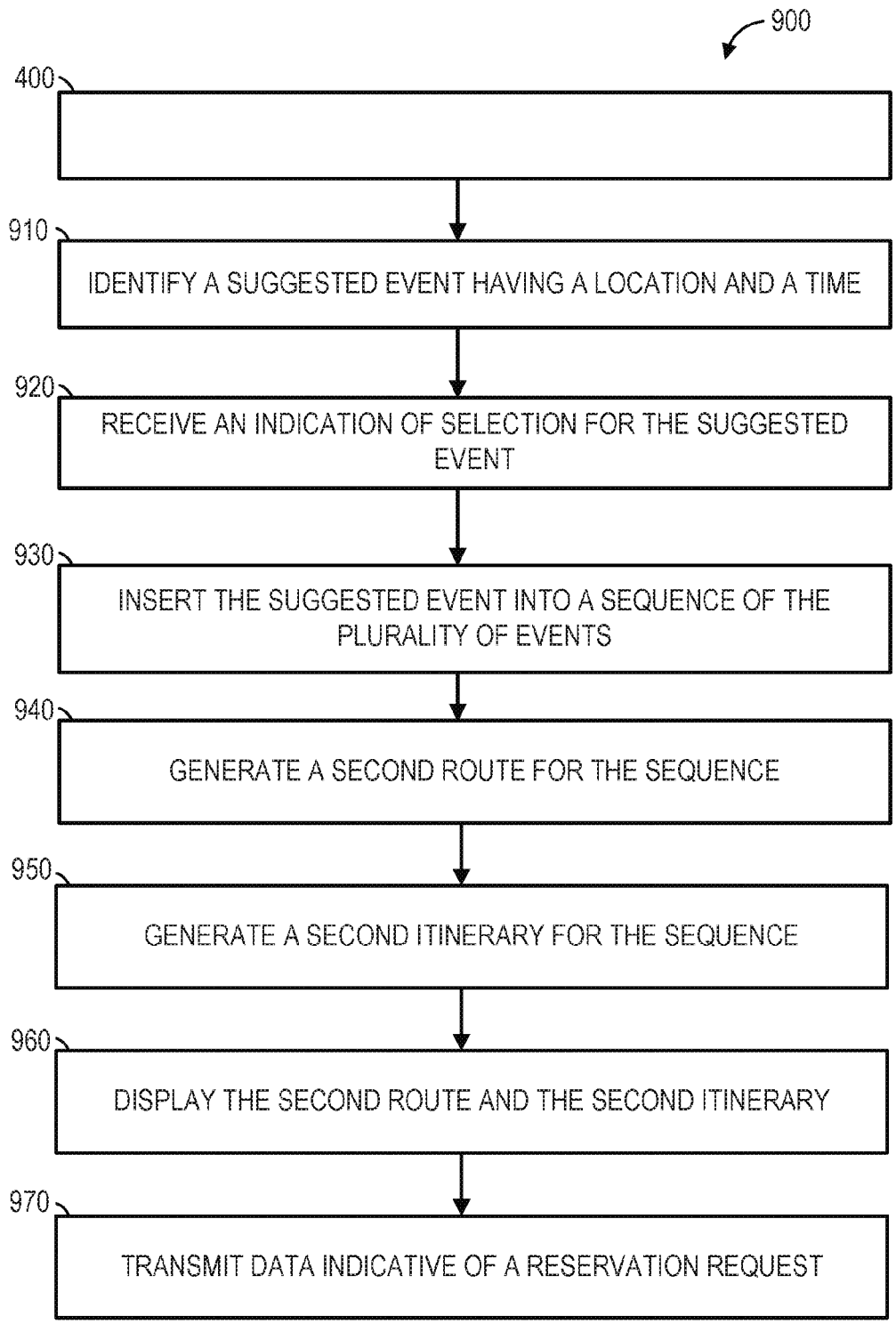
FIG. 9 is a flow chart illustrating operations of a device in performing a method of sequencing events, generating an itinerary and route based on the sequence, and scheduling a reservation of a suggested event, according to some example embodiments.
Figure 11:
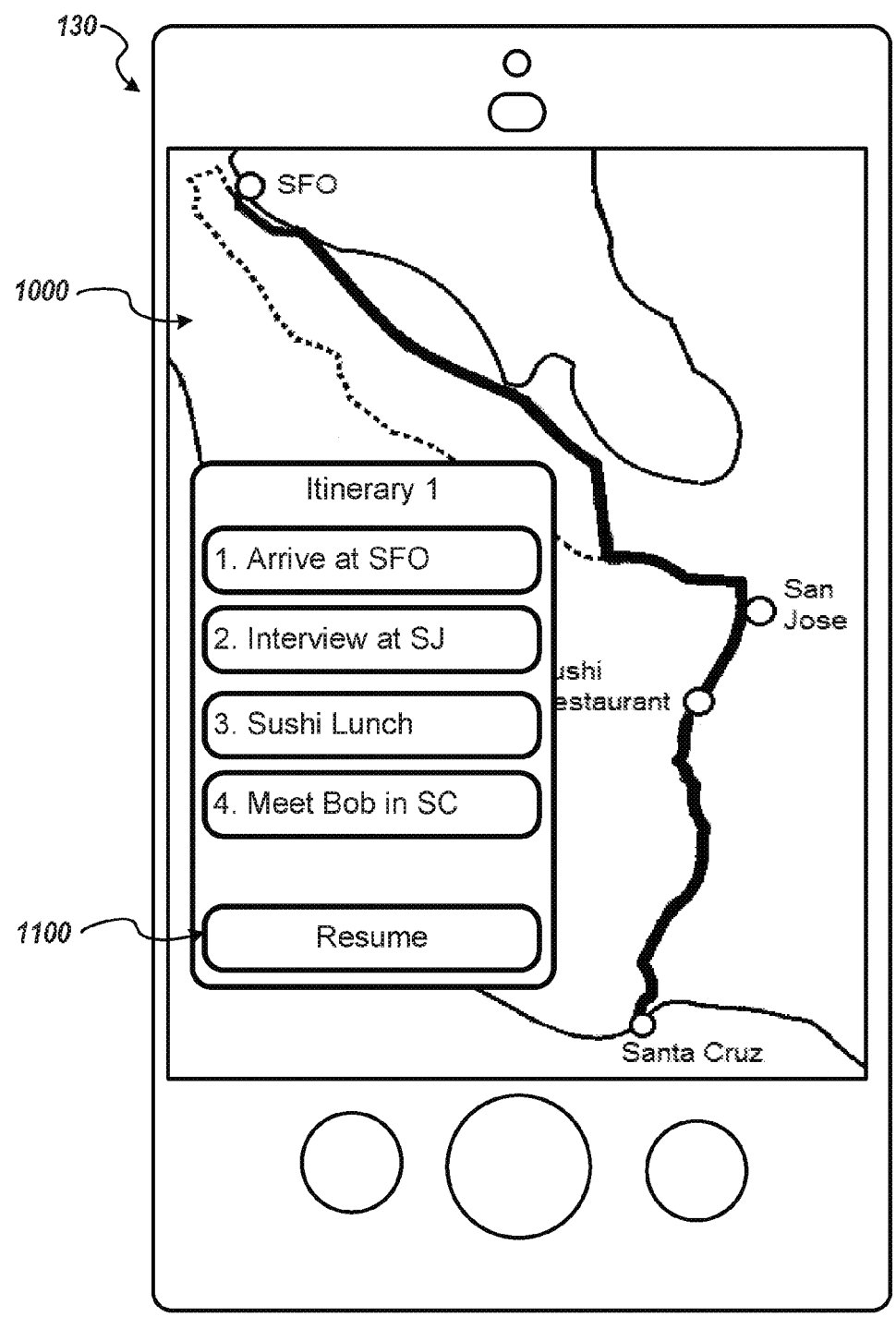
FIG. 11 is an illustration of an example itinerary incorporating a suggested event, according to some example embodiments.

Referring to FIGS. 9 and 11, in the operation 920, the device 130 may receive an indication that the suggested event or location is selected by the user 132. In some embodiments, the device 130 may display the suggested event or location on the graphical user interface of the application, such as in a branching route connected the route generate in the method 400. In some embodiments, the device 130 may display the suggested event or location proximate to the route generated by the method 400. In either event, the device 130 may present the suggested event or location as a user selectable element on the graphical user interface of the application.

In the operation 930, the device 130 may insert the suggested event into a sequence of the plurality of events. In some embodiments, the device 130 may insert the suggested event into the sequence at a time or position commensurate with a current time or location. For example, the device 130 may insert the suggested event or location of a lunch with a starting time of 12:30 p.m. when the device suggested the event at 12:00 p.m. In some embodiments, the device 130 may re-determine the sequence to generate a second sequence indicative of the suggested event or location and the plurality of events based at least in part on the selection factors. In some embodiments, the suggested event may be inserted into the sequence without regard to or despite the order in which the suggested event was identified.

As shown in FIG. 11, the application 1000 may insert the suggested event into the itinerary and the route previously determined by the device 130. In some embodiments, where the itinerary or travel along the route is disrupted by the event, the application 1000 may provide a selectable element 1110 configured to resume the itinerary or directions along the route within the application 1000.

Referring again to FIG. 9, in the operation 940, the device 130 may generate a second route for the sequence or the second sequence. The second route may comprise transportation directions between locations of the sequence or second sequence, or between locations corresponding to the plurality of events of the sequence or the second sequence. For example, where the device 130 receives a starting location, a first location, a second location, and identifies the suggested location, the second route may comprise transportation directions between the starting location, the second location, the first location, and the location of the suggested event, indicative of the second sequence.

In the operation 950, the device 130 may generate a second itinerary for the sequence. The second itinerary may comprise information indicative of the plurality of events ordered according to the second sequence. For example, where the device 130 has received a first event, a second event, and the suggested event, the second itinerary may comprise information indicative of the first event, information indicative of the second event, and information indicative of the suggested event ordered according to the sequence. The second route may extend between the starting location, the second location, the first location, and the location of the suggested event.

In the operation 960, the device 130 may display the second route and the second itinerary in a graphical user interface of an application.

In the operation 970, the device 130 may transmit data indicative of a reservation request to a merchant associated with the suggested location at a selected time within the sequence. For example, where the device 130 makes a suggestion of a lunch location at a restaurant, the device 130 may initially present the user 132 with a selectable element indicative of the suggested event of the lunch. The device 130 may then present the user 132 with a plurality of data entry fields configured to receive information indicative of a reservation, such as information about the user or a group including the user 132. Once the device 130 receives information sufficient to schedule the reservation, the device 130 may transmit the data indicative of the reservation request. In some embodiments, the device 130 may present the user with a plurality of data entry fields indicative of an order or request for service and transmit the data associated with the order or request for service to the merchant. For example, in lieu of or in addition to the information indicative of a reservation, the device 130 may present a restaurant menu, from which the user 132 may order food for delivery or pick up along the route of the itinerary. In some embodiments, the device 130 may receive a confirmation of the reservation request and update the itinerary or route including the suggested location or event to reflect the confirmed reservation.

In some embodiments, the application may provide a merchant interface, for use in conjunction with the reservation request, for example. The merchant interface may be non-merchant specific and enable local merchants to interact with customers and offer indications of availability. In some embodiments, the application may enable the merchants to input one or more events into the application, such as a plurality of scheduled or available appointment times. The device 130 may receive or otherwise access the indications of availability of merchants within a predetermined proximity and use the indications of availability as a factor in identifying suggested locations, events, or activities.

In some embodiments, the device 130 may determine a sequence for the one or more events entered by the merchant. For example, where the merchant is mobile, such as a service provider performing maintenance on client homes or a food truck, the merchant may enter the one or more events, at differing locations, to determine a sequence for the one or more events, for events which may be reorganized in relation to an associated time, or to determine a route between the one or more events, for events having specified associated times. The device 130 may then generate a route or itinerary for the merchant. In these embodiments, the device 130 may display the route in a graphical user interface of an application available to the merchant, and may also transmit a portion of the information contained in the route or itinerary to the network-based system 105, and thereby make the information available to other users of the application.

Figure 12A:
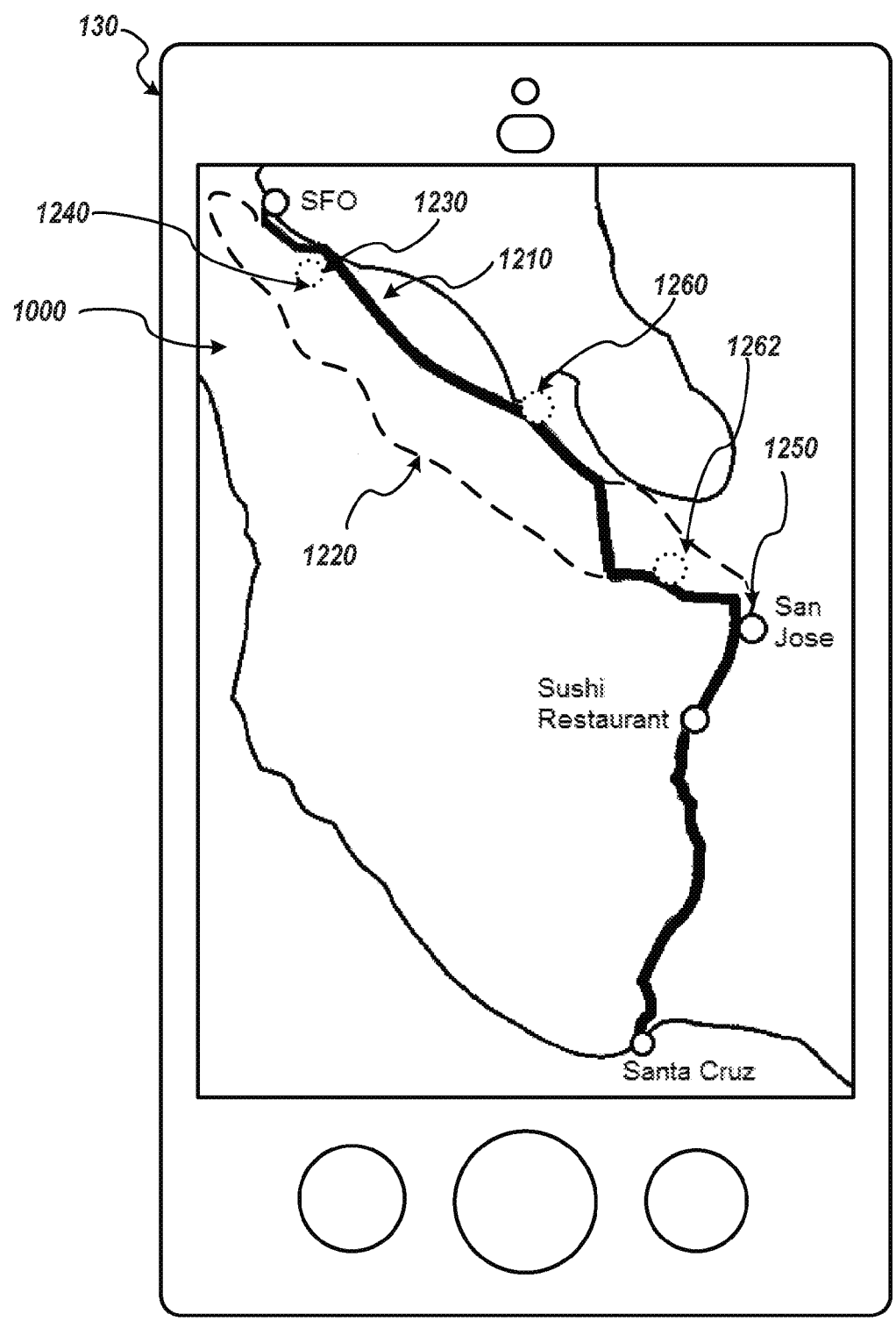
FIG. 12A is an illustration of an example set of routes determined by the itinerary generation system, according to some example embodiments.

As shown in FIG. 12A, in some embodiments, the application 1000 may generate a plurality of routes based on suggested events along a plurality of routes extending between scheduled events included within the itinerary. In some embodiments, as shown, the application 1000 may generate the plurality of routes with associated suggested events prior to starting the route or itinerary. Additionally, the application 1000 may generate the plurality of routes prior to selection of a suggested event or location. For example, the application 1000 may provide a first route 1210 and a second route 1220. Where the application 1000 suggests a breakfast location 1230 along the first route 1210, the application may provide the suggestion as an optional element 1240 differing in appearance from a required element 1250, such as one of the scheduled events within the itinerary. In some embodiments, the application 1000 may suggest events or locations only along a selected route of the first route 1210 and the second route 1220.

Figure 12B:
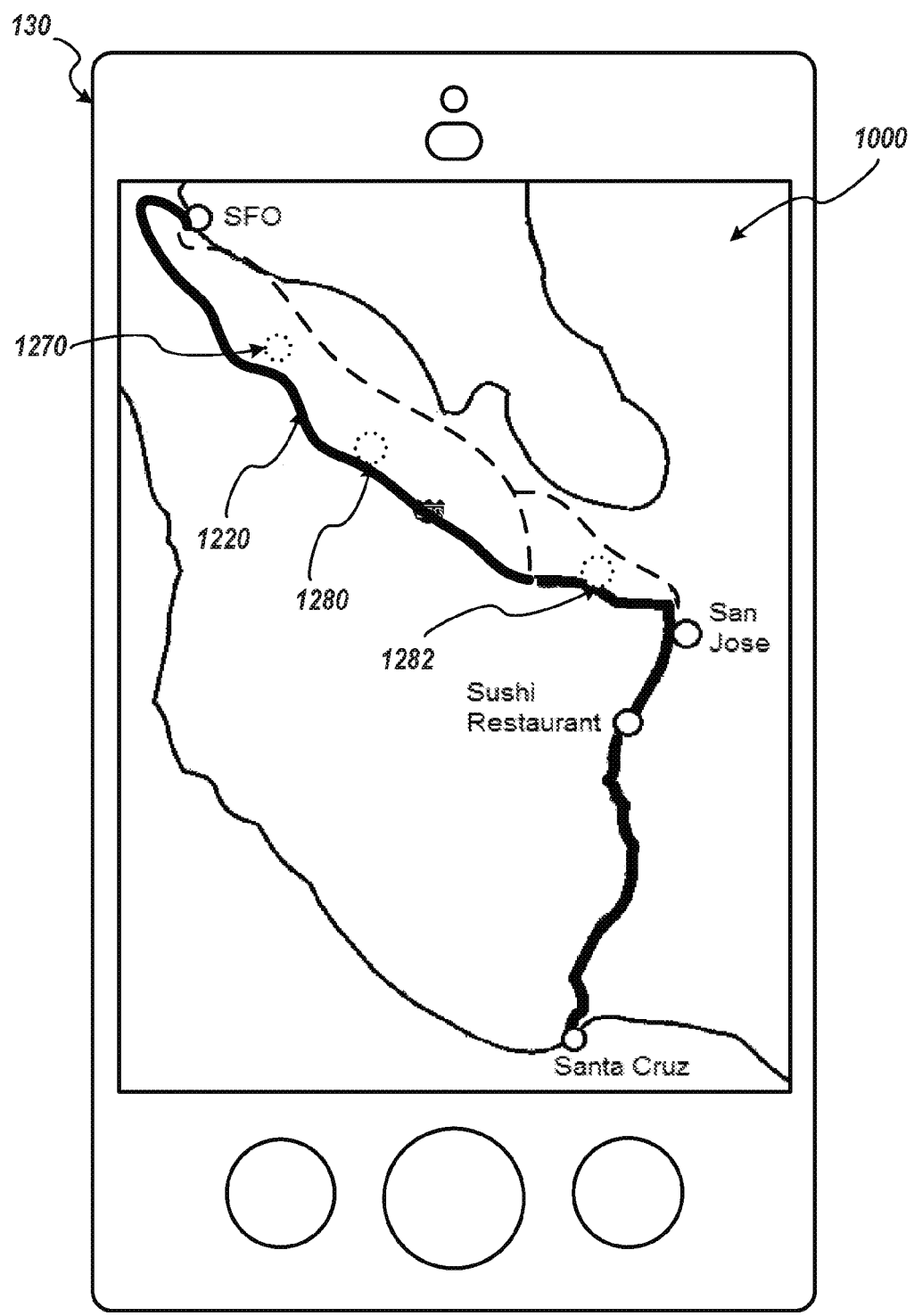
FIG. 12B is an illustration of an example selected route of the example set of routes determined by the itinerary generation system, according to some example embodiments.

As shown in FIGS. 12A and 12B, when the first route 1210 is selected, the application 1000 may provide the breakfast location 1230 and two scenic locations 1260 and 1262, shown in FIG. 12A. As shown in FIG. 12B, when the second route 1220 is selected, the application 1000 may provide a second breakfast location 1270 and two second scenic locations 1280 and 1282.

Figure 13:
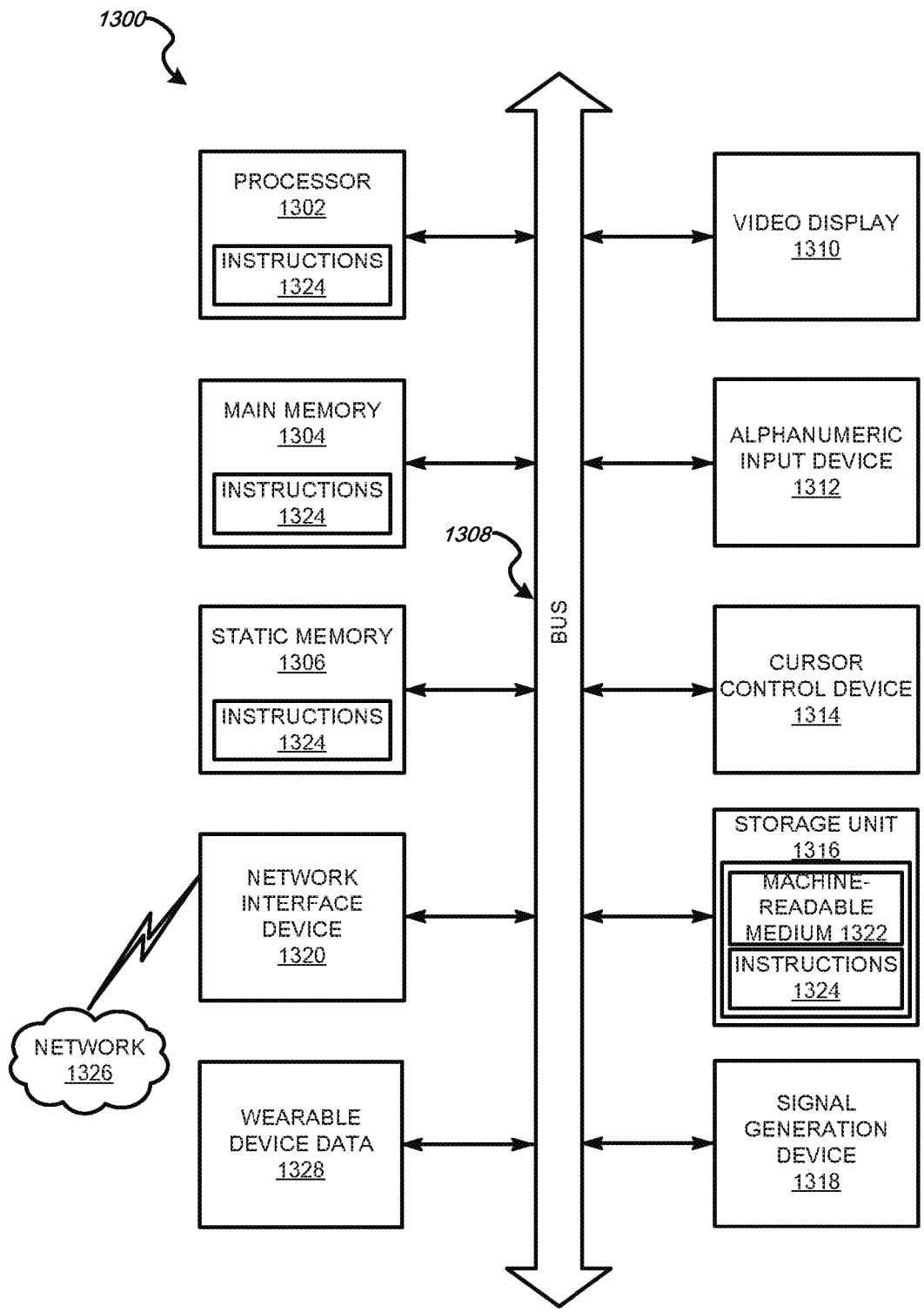
FIG. 13 is a block diagram illustrating components of a machine, according to some example embodiments, able to read instructions from a machine-readable medium and perform any one or more of the methodologies discussed herein.

Referring to FIG. 13, the block diagram illustrates components of a machine 1300, according to some example embodiments, able to read instructions 1324 from a machine-readable medium 1322 (e.g., a non-transitory machine-readable medium, a machine-readable storage medium, a computer-readable storage medium, or any suitable combination thereof) and perform any one or more of the methodologies discussed herein, in whole or in part. Specifically, FIG. 13 shows the machine 1300 in the example form of a computer system (e.g., a computer) within which the instructions 1324 (e.g., software, a program, an application 240, 500, 600, or 1000, an applet, an app, or other executable code) for causing the machine 1300 to perform any one or more of the methodologies discussed herein may be executed, in whole or in part.

In alternative embodiments, the machine 1300 operates as a standalone device or may be connected (e.g., networked) to other machines. In a networked deployment, the machine 1300 may operate in the capacity of a server machine or a client machine in a server-client network environment, or as a peer machine in a distributed (e.g., peer-to-peer) network environment. The machine 1300 may include hardware, software, or combinations thereof, and may as examples be a server computer, a client computer, a personal computer (PC), a tablet computer, a laptop computer, a netbook, a cellular telephone, a smartphone, a STB, a PDA, a web appliance, a network router, a network switch, a network bridge, or any machine capable of executing the instructions 1324, sequentially or otherwise, that specify actions to be taken by that machine. Further, while only a single machine 1300 is illustrated, the term "machine" shall also be taken to include any collection of machines 1300 that individually or jointly execute the instructions 1324 to perform all or part of any one or more of the methodologies discussed herein.

The machine 1300 includes a processor 1302 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1304, and a static memory 1306, which are configured to communicate with each other via a bus 1308. The processor 1302 may contain microcircuits that are configurable, temporarily or permanently, by some or all of the instructions 1324, such that the processor 1302 is configurable to perform any one or more of the methodologies described herein, in whole or in part. For example, a set of one or more microcircuits of the processor 1302 may be configurable to execute one or more modules (e.g., software modules) described herein.

The machine 1300 may further include one or more sensors 1328, suitable for obtaining various sensor data. The machine 1300 may further include a video display 1310

(e.g., a plasma display panel (PDP), a light emitting diode (LED) display, a liquid crystal display (LCD), a projector, a cathode ray tube (CRT), or any other display capable of displaying graphics or video). The machine 1300 may also include an alphanumeric input device 1312 (e.g., a keyboard or keypad), a cursor control device 1314 (e.g., a mouse, a touchpad, a trackball, a joystick, a motion sensor, an eye tracking device, or other pointing instrument), a storage unit 1316, a signal generation device 1318 (e.g., a sound card, an amplifier, a speaker, a headphone jack, or any suitable combination thereof), and a network interface device 1320.

The storage unit 1316 includes the machine-readable medium 1322 (e.g., a tangible and non-transitory machine-readable storage medium) on which are stored the instructions 1324 embodying any one or more of the methodologies or functions described herein, including, for example, any of the descriptions of FIGS. 1-12B. The instructions 1324 may also reside, completely or at least partially, within the main memory 1304, within the processor 1302 (e.g., within the processor's cache memory), or both, before or during execution thereof by the machine 1300. The instructions may also reside in the static memory 1306.

Accordingly, the main memory 1304 and the processor 1302 may be considered machine-readable media 1322 (e.g., tangible and non-transitory machine-readable media). The instructions 1324 may be transmitted or received over a network 1326 via the network interface device 1320. For example, the network interface device 1320 may communicate the instructions 1324 using any one or more transfer protocols (e.g., Hypertext Transfer Protocol (HTTP)). The machine 1300 may also represent example means for performing any of the functions described herein, including the processes described in FIGS. 1-12B.

In some example embodiments, the machine 1300 may be a portable computing device, such as a smart phone or tablet computer, and have one or more additional input components (e.g., sensors or gauges), not shown. Examples of such input components include an image input component (e.g., one or more cameras), an audio input component (e.g., a microphone), a direction input component (e.g., a compass), a location input component (e.g., a GPS receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1322 able to store data temporarily or permanently and may be taken to include, but not be limited to, RAM, read-only memory (ROM), buffer memory, flash memory, and cache memory. While the machine-readable medium 1322 is shown in an example embodiment to be a single medium, the term "machine-readable medium" should be taken to include a single medium or multiple media (e.g., a centralized or distributed database, or associated caches and servers) able to store instructions 1324. The term "machine-readable medium" shall also be taken to include any medium, or combination of multiple media, that is capable of storing the instructions 1324 for execution by the machine 1300, such that the instructions 1324, when executed by one or more processors of the machine 1300 (e.g., processor 1302), cause the machine 1300 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium is non-transitory in that it does not embody a propagating signal. However, labeling the tangible machine-readable medium as "non-transitory" should not be construed to mean that the medium is incapable of movement; the medium should be considered as being transportable from one physical location to another. Additionally, since the machine-readable medium is tangible, the medium may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium 1322 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors 1302) may be configured by software (e.g., an application 240, 500, 600, or 1000 or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 1302 or other programmable processor 1302. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 1302 configured by software to become a special-purpose processor, the general-purpose processor 1302 may be configured as respectively different special-purpose processors (e.g., comprising different hardware modules) at different times. Software (e.g., a software module) may accordingly configure one or more processors 1302, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1302 that are temporarily configured (e.g., by software) or permanently configured to perform the relevant operations. Whether temporarily or permanently configured, such processors 1302 may constitute processor-implemented modules that operate to perform one or more operations or functions described herein. As used herein, "processor-implemented module" refers to a hardware module implemented using one or more processors 1302.

Similarly, the methods described herein may be at least partially processor-implemented, with a processor 1302 being an example of hardware. For example, at least some of the operations of a method may be performed by one or more processors 1302 or processor-implemented modules. As used herein, "processor-implemented module" refers to a hardware module in which the hardware includes one or more processors 1302. Moreover, the one or more processors 1302 may also operate to support performance of the relevant operations in a "cloud computing" environment or as a "software as a service" (SaaS). For example, at least some of the operations may be performed by a group of computers (as examples of machines 1300 including processors), with these operations being accessible via a network 1326 (e.g., the Internet) and via one or more appropriate interfaces (e.g., an API).

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine 1300. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine 1300 (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   receiving, from a client device, a first location and a second location, the first location is a location of a first event at a first time, the second location is a location of a second event;
   determining a sequence for the first location and the second location with the second location preceding the first location in the sequence;
   generating a first route for the sequence, the first route comprising transportation directions between the second location and the first location indicative of the sequence;
   based on the first location and time and the second location and time, identifying a suggested event having a location and a time;
   inserting the suggested event into the sequence;
   generating a second route for the sequence, the second route comprising transportation directions between the second location, the location of the suggested event, and the first location indicative of the sequence; and
   displaying the second route in a graphical user interface of the client device.

2. The method of claim 1, wherein the suggested event corresponds to an available appointments from a plurality of available appointments; and the method of claim 1 further comprises:
   receiving, from an additional client device, the plurality of available appointments;
   storing the plurality of available appointments on a storage device; and
   responsive to receiving the first and second locations, accessing the plurality of available appointments.

3. The method of claim 2, wherein the plurality of available appointments includes at least a first appointment having a first appointment time and a first appointment location and a second appointment having a second appointment time and a second appointment location, wherein the second appointment time is different than the first appointment time and the second appointment location is different than the first appointment location.

4. The method of claim 2, wherein the suggested event is identified based on the first location and time, the second location and time, and the plurality of available appointments received from the additional client device.

5. The method of claim 2, further comprising:
receiving, from the client device, user preferences for suggested events; and
wherein the suggested event is identified based on the first location and time, the second location and time, and user preferences received from the client device.

6. The method of claim 2, further comprising:
accessing recommendations corresponding to the plurality of available appointments; and wherein the suggested event is identified based on the first location and time, the second location and time, and the accessed recommendations.

7. The method of claim 2, further comprising:
receiving, from the client device, selection of the suggested event through a selectable element displayed on the graphical user interface of the client device; and
transmitting, to the additional client device, an indication that the suggested event is selected.

8. The method of claim 2, further comprising:
generating an itinerary for the first location and the second location, the itinerary comprising information indicative of the first location and information indicative of the second location ordered according to the sequence; and wherein first the route extends between the second location and the first location.

9. The method of claim 8, further comprising:
responsive to inserting the suggested event into the sequence, generating a second itinerary for the sequence, the second itinerary comprising information indicative of the first event, information indicative of the second event, and information indicative of the suggested event ordered according to the sequence; and wherein the second route extends between the second location, location of the suggested event, and the first location; and
displaying the second route in the graphical user interface of the client device.

10. A system comprising:
one or more processors of a machine;
a memory storing instructions that, when executed by the one or more processors, cause the machine to perform operations comprising:
receiving, from a client device, a first location and a second location, the first location is a location of a first event at a first time, the second location is a location of a second event;
determining a sequence for the first location and the second location with the second location preceding the first location in the sequence;
generating a first route for the sequence, the first route comprising transportation directions between the second location and the first location indicative of the sequence;
based on the first location and time and the second location and time, identifying a suggested event having a location and a time;
inserting the suggested event into the sequence;
generating a second route for the sequence, the second route comprising transportation directions between the second location, the location of the suggested event, and the first location indicative of the sequence; and
displaying the second route in a graphical user interface of the client device.

11. The system of claim 10, wherein the suggested event corresponds to an available appointments from a plurality of available appointments; and wherein the instructions further cause the machine to perform operations comprising:
receiving, from an additional client device, the plurality of available appointments;
storing the plurality of available appointments on a storage device; and
responsive to receiving the first and second locations, accessing the plurality of available appointments.

12. The system of claim 11, wherein the plurality of available appointments includes at least a first appointment having a first appointment time and a first appointment location and a second appointment having a second appointment time and a second appointment location, wherein the second appointment time is different than the first appointment time and the second appointment location is different than the first appointment location.

13. The system of claim 11, wherein the suggested event is identified based on the first location and time, the second location and time, and the plurality of available appointments received from the additional client device.

14. The system of claim 11, wherein the instructions further cause the machine to perform operations comprising:
receiving, from the client device, user preferences for suggested events; and
wherein the suggested event is identified based on the first location and time, the second location and time, and user preferences received from the client device.

15. The system of claim 11, wherein the instructions further cause the machine to perform operations comprising:
accessing recommendations corresponding to the plurality of available appointments; and wherein the suggested event is identified based on the first location and time, the second location and time, and the accessed recommendations.

16. The system of claim 11, wherein the instructions further cause the machine to perform operations comprising:
receiving, from the client device, selection of the suggested event through a selectable element displayed on the graphical user interface of the client device; and
transmitting, to the additional client device, an indication that the suggested event is selected.

17. The system of claim 11, wherein the instructions further cause the machine to perform operations comprising:
generating an itinerary for the first location and the second location, the itinerary comprising information indicative of the first location and information indicative of the second location ordered according to the sequence; and wherein first the route extends between the second location and the first location.

18. The system of claim 17, wherein the instructions further cause the machine to perform operations comprising:
responsive to inserting the suggested event into the sequence, generating a second itinerary for the sequence, the second itinerary comprising information indicative of the first event, information indicative of the second event, and information indicative of the suggested event ordered according to the sequence; and wherein the second route extends between the second location, location of the suggested event, and the first location; and displaying the second route in the graphical user interface of the client device.

19. A non-transitory machine-readable storage medium embodying instructions that, when executed by a machine, cause the machine to perform operations comprising:

receiving, from a client device, a first location and a second location, the first location is a location of a first event at a first time, the second location is a location of a second event;

determining a sequence for the first location and the second location with the second location preceding the first location in the sequence;

generating a first route for the sequence, the first route comprising transportation directions between the second location and the first location indicative of the sequence;

based on the first location and time and the second location and time, identifying a suggested event having a location and a time;

inserting the suggested event into the sequence;

generating a second route for the sequence, the second route comprising transportation directions between the second location, the location of the suggested event, and the first location indicative of the sequence; and displaying the second route in a graphical user interface of the client device.

20. The computer-readable storage medium of claim 19, wherein the instructions further cause the machine to perform operations comprising:

receiving, from an additional client device, the plurality of available appointments;

storing the plurality of available appointments on a storage device; and responsive to receiving the first and second locations, accessing the plurality of available appointments.

* * * * *